United States Patent
McCoy et al.

(10) Patent No.: US 10,384,639 B2
(45) Date of Patent: Aug. 20, 2019

(54) PLUS-TWO BELT REMINDER SYSTEM

(71) Applicant: Ford Global Technologies, LLC, Dearborn, MI (US)

(72) Inventors: Robert William McCoy, Ann Arbor, MI (US); Dean M. Jaradi, Macomb, MI (US); Mohammed Omar Faruque, Ann Arbor, MI (US); S.M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/274,586

(22) Filed: Sep. 23, 2016

(65) Prior Publication Data
US 2018/0086303 A1 Mar. 29, 2018

(51) Int. Cl.
*B60R 22/00* (2006.01)
*B60R 22/02* (2006.01)
*B60R 21/015* (2006.01)
*B60R 22/48* (2006.01)

(52) U.S. Cl.
CPC ...... *B60R 22/023* (2013.01); *B60R 21/01512* (2014.10); *B60R 22/48* (2013.01); *B60R 2022/026* (2013.01); *B60R 2022/027* (2013.01); *B60R 2022/4816* (2013.01)

(58) Field of Classification Search
CPC ........ B60R 2022/4825; B60R 21/0155; B60R 22/48; B60R 2022/027
See application file for complete search history.

(56) References Cited

U.S. PATENT DOCUMENTS

| 4,103,842 | A | * | 8/1978 | Martin | B60R 22/343 |
| | | | | | 188/139 |
| 4,346,778 | A | | 8/1982 | Blueggel et al. | |
| 4,747,215 | A | | 5/1988 | Waikas | |
| 4,885,566 | A | | 12/1989 | Aoki et al. | |
| 5,141,249 | A | * | 8/1992 | Saitoh | B60R 22/06 |
| | | | | | 280/801.2 |
| 5,413,378 | A | | 5/1995 | Steffens et al. | |
| 5,433,014 | A | | 7/1995 | Falk et al. | |

(Continued)

FOREIGN PATENT DOCUMENTS

| CN | 103010152 A | 4/2013 |
| CN | 105083209 A | 11/2015 |

(Continued)

OTHER PUBLICATIONS

UKIPO Search Report under Section 17(5) for Application No. GB1704557.6 dated Jul. 20, 2017 (7 pages).

(Continued)

*Primary Examiner* — Nicole T Verley
(74) *Attorney, Agent, or Firm* — Frank A. MacKenzie; Bejin Bieneman PLC

(57) ABSTRACT

A plus-two belt system is provided. The plus-two belt system is a supplement to a traditional three-point belt system. The plus-two belt system has a longitudinal webbing anchored at a first end and coiled on a retractor at a second end. When an occupant is sensed and the vehicle engine is on, a reminder chime can sound when a magnetic strip in the webbing of the plus-two belt system is detected. The magnetic strip can be detected with a Hall effect sensor and the Hall effect sensor can be located adjacent the retractor.

12 Claims, 4 Drawing Sheets

(56) References Cited

U.S. PATENT DOCUMENTS

| | | | |
|---|---|---|---|
| 5,454,591 A | 10/1995 | Mazur et al. | |
| 5,653,504 A | 8/1997 | Henson | |
| 5,709,408 A * | 1/1998 | Carraway, Jr. | B60R 22/06 180/268 |
| 5,906,393 A | 5/1999 | Mazur et al. | |
| 6,203,059 B1 | 3/2001 | Mazur et al. | |
| 6,439,333 B2 | 8/2002 | Domens et al. | |
| 6,448,907 B1 | 9/2002 | Naclerio | |
| 6,581,960 B1 | 6/2003 | Schondorf et al. | |
| 6,616,186 B1 | 9/2003 | Midorikawa et al. | |
| 6,869,105 B2 * | 3/2005 | Cheng | B60R 22/06 280/804 |
| 7,163,075 B2 * | 1/2007 | Gray | B60R 21/01546 180/273 |
| 7,306,261 B2 * | 12/2007 | Nomura | B60R 22/44 242/374 |
| 7,419,026 B2 * | 9/2008 | Midorikawa | B60R 22/18 180/268 |
| 7,576,642 B2 | 8/2009 | Rodemer | |
| 7,735,766 B2 * | 6/2010 | Nomura | B60R 22/44 242/390.2 |
| 8,095,274 B2 * | 1/2012 | Burkhardtsmaier | B60R 21/01548 280/734 |
| 8,195,365 B2 * | 6/2012 | Bernhagen | B60R 22/48 280/801.1 |
| 8,302,995 B2 * | 11/2012 | Xu | B60R 21/0136 280/806 |
| 8,303,043 B2 * | 11/2012 | Humbert | B60R 22/40 297/477 |
| 8,952,801 B2 * | 2/2015 | Larice | B60Q 9/00 340/457.1 |
| 9,434,349 B1 | 9/2016 | Perkins et al. | |
| 2002/0063009 A1 | 5/2002 | Oyaski | |
| 2004/0036270 A1 * | 2/2004 | Roychoudhury | B60R 22/02 280/802 |
| 2004/0135360 A1 * | 7/2004 | Stanley | B60R 22/18 280/806 |
| 2004/0160339 A1 | 8/2004 | Yamanoi et al. | |
| 2005/0206152 A1 * | 9/2005 | Delventhal | B60R 21/01516 280/805 |
| 2006/0095184 A1 * | 5/2006 | Gray | B60R 21/01532 701/45 |
| 2006/0119091 A1 * | 6/2006 | Takao | B60R 22/022 280/801.1 |
| 2007/0216214 A1 * | 9/2007 | Delventhal | B60R 22/36 297/478 |
| 2008/0094195 A1 | 4/2008 | Odate et al. | |
| 2009/0112408 A1 * | 4/2009 | Kankanala | B60R 22/48 701/45 |
| 2009/0267339 A1 | 10/2009 | Usoro et al. | |
| 2009/0303065 A1 | 12/2009 | Lipowski | |
| 2010/0114436 A1 | 5/2010 | Bernhagen | |
| 2013/0073148 A1 * | 3/2013 | Dolan | B60R 22/36 701/45 |
| 2013/0328296 A1 * | 12/2013 | Burkhardtsmaier | B60R 22/18 280/808 |
| 2015/0265200 A1 | 9/2015 | Mahdi et al. | |
| 2015/0360643 A1 | 12/2015 | Cech et al. | |
| 2016/0059818 A1 | 3/2016 | Witt et al. | |
| 2016/0159320 A1 | 6/2016 | Andreen | |
| 2016/0347278 A1 | 12/2016 | Bibbs | |
| 2017/0028965 A1 * | 2/2017 | Ohno | B60R 22/06 |
| 2017/0144625 A1 | 5/2017 | Le et al. | |
| 2017/0291576 A1 | 10/2017 | Le et al. | |

FOREIGN PATENT DOCUMENTS

| | | | |
|---|---|---|---|
| CN | 204937070 U | 1/2016 | |
| CN | 205059529 U | 3/2016 | |
| DE | 9001271 U1 | 4/1990 | |
| DE | 102004055396 A1 | 5/2006 | |
| DE | 102010002186 A1 | 8/2011 | |
| DE | 102010045416 A1 | 3/2012 | |
| EP | 1116633 A2 | 7/2001 | |
| EP | 2108550 A1 | 10/2009 | |
| EP | 2653354 A1 | 10/2013 | |
| FR | 2310139 A1 | 12/1976 | |
| GB | 1281791 A | 7/1972 | |
| GB | 1315106 A | 4/1973 | |
| GB | 2414442 A | 11/2005 | |
| JP | 2000211476 A | 8/2000 | |
| JP | 2008149996 A | 7/2008 | |
| JP | 2009057019 A | 3/2009 | |
| JP | 2016005948 A | 1/2016 | |
| KR | 101266117 B1 | 5/2013 | |
| WO | 9214986 A1 | 9/1992 | |
| WO | 2006053600 A1 | 5/2006 | |
| WO | WO-2007065607 A1 * | 6/2007 | B60R 22/02 |

OTHER PUBLICATIONS

Ponticel, Patrick, No one gets the cold shoulder with Autoliv's two-point seatbelt, May 9, 2012, http://articles.sae.org/11023/ (1 page).

Final Office Action dated Nov. 1, 2017 for USPA No. 15274459 (37 pages).

Non-Final Office Action dated Jan. 23, 2018; U.S. Appl. No. 15/095,355, filed Apr. 11, 2016.

Search Report from the United Kingdom Intellectual Property Office dated Feb. 21, 2018 regarding GB Application No. 17115074.9 (5 pages).

Search Report from United Kingdom Intellectual Property Office dated Feb. 21, 2018 regarding GB Application No. 1715106.9 (4 pages).

Search Report from the United Kingdom Intellectual Property Office dated Sep. 20, 2018 regarding Application No. GB1715074.9 (3 pages).

* cited by examiner

PLUS-TWO BELT REMINDER SYSTEM

BACKGROUND

Vehicles currently provide three-point seat belt restraining systems for the vehicle occupants. Current three-point restraining systems often include a seat belt reminder system that includes sensors positioned in a buckle to determine whether the three-point belt has been engaged. If the buckle has not been engaged a reminder system will chime to remind the occupant to "buckle up." Plus-two supplemental restraining systems have been discussed as an added restraint to a three-point belt. The plus-two supplemental system provides an additional two points of restraint to the prior three-point systems. Plus-two systems do not include a buckle, but rather are fixed at one end and retractable at the other end. Plus-two belt systems do not currently have reminder systems.

DETAILED DESCRIPTION

Figure 1:
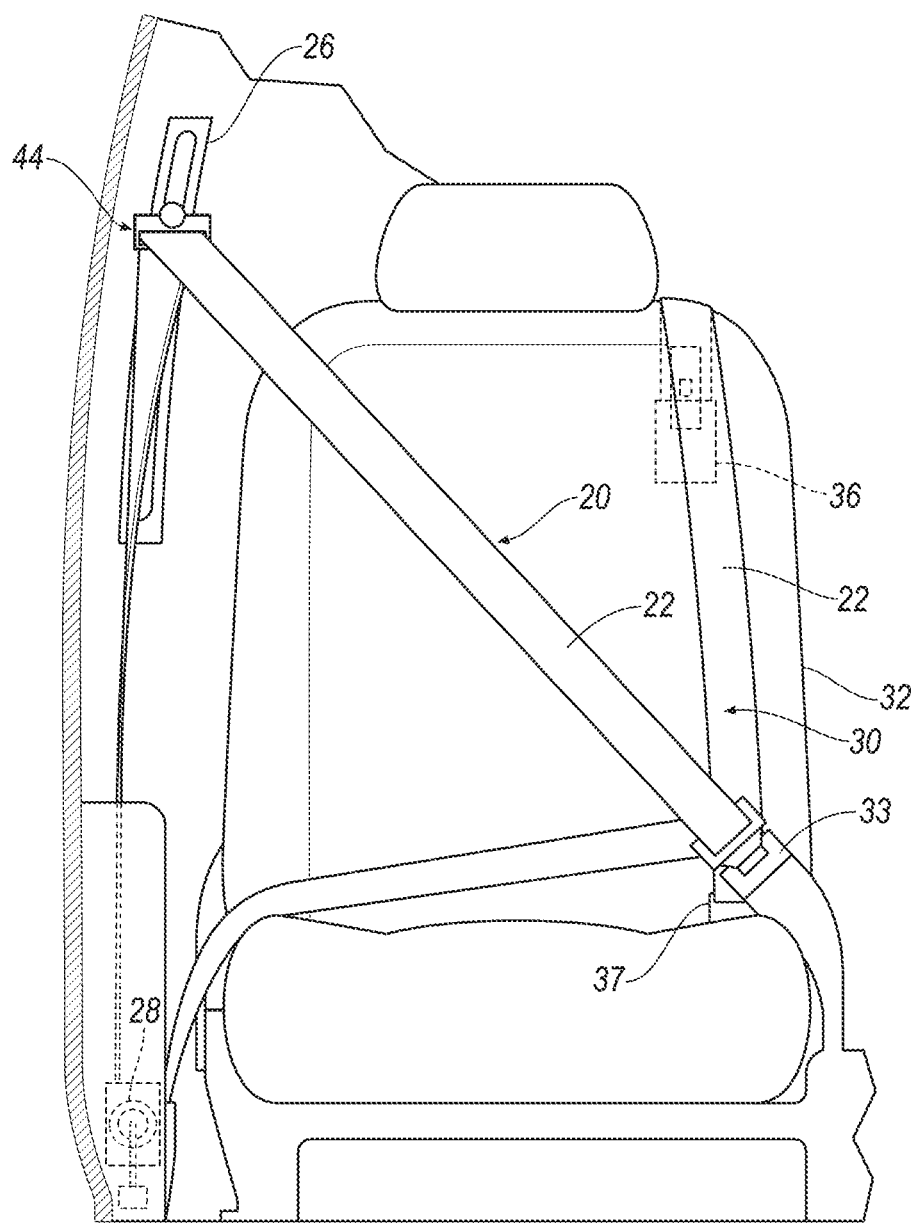
FIG. 1 is a front plan view of a plus-two belt system with a three-point system.

The present disclosure provides a reminder system for a plus-two supplemental occupant restraint in a vehicle. A plus-two occupant restraint provides a restraint that is in addition to a traditional three-point occupant restraint. With a traditional three-point restraint an occupant pulls the webbing of a belt across their torso and fastens the belt with a buckle. A sensor may be positioned in the buckle, with the buckle sensor configured to recognize when the buckle is engaged. When the buckle is not engaged a reminder system can initiate an alarm in the form of a reminder chime or other signal to remind the occupant to engage the buckle. A plus-two belt system does not have a buckle. Rather, in use the plus-two belt provides a webbing with a first end fixed, either at a seat or the vehicle floor, and a second end is attached to a retractor such that the plus-two belt may be pulled out by an occupant for use. In use an occupant does not pull the plus-two belt across their torso but rather slips their arm under the plus-two belt system and pulls it over their shoulder like a backpack strap.

A magnetic strip or magnetic wire mesh is sewn into the webbing and positioned adjacent a sensor when the plus-two belt is not in use. As described the sensor may be a Hall effect sensor. The sensor is positioned adjacent the retractor. When the vehicle ignition is on and an occupant is sensed a vehicle system will initiate a belt reminder signal when the sensor detects the magnet or wire mesh.

A Hall effect sensor includes a thin piece of rectangular p-type semiconductor material such as gallium arsenide (GaAs), indium antimonide (InSb) or indium arsenide (InAs) passing a continuous current through itself. The current is provided by the vehicle system. When the sensor is placed within a magnetic field, the magnetic flux lines exert a force on the semiconductor material which deflects the charge carriers, electrons and holes, to either side of the semiconductor material creating a potential difference between the two sides of the semiconductor material. The presence of the magnetic strip in the webbing produces the signal in the sensor and the absence of such strip removes the signal from the sensor. The determination of whether the occupant has positioned him or herself properly in the plus-two belt is based on the webbing length pulled from the retractor and whether the magnetic strip or webbing is detected.

In the normal, unoccupied state, the plus-two belt is held taut by the retractor and the magnetic strip or webbing is within readable vicinity of the sensor. When the vehicle engine is turned on by the vehicle operator, the Hall effect sensor senses the magnetic strip in the plus-two webbing and the belt reminder is activated. The plus-two belt reminder system is in addition to the normal three-point seatbelt belt reminder. After the occupant slips their arm under the plus-two belt to place the belt/webbing over their shoulder the magnetic strip in the webbing is pulled out and away from the Hall effect sensor, the Hall effect sensor no longer detects the magnetic strip or webbing and the belt reminder turns off.

With reference to FIG. 1 there is shown a traditional three-point belt system 20 in combination with a plus-two belt system 30. Both the three-point belt system 20 and plus-two belt system 30 use a webbing 22 to restrain an occupant in a seat 32. The webbing 22 has a longitudinal length and is made from a suitable material, for example Nylon. The three-point belt system 20 may include an anchor point 44 which is adjustable in a track 26. In the three-point belt system 20 the webbing 22 is uncoiled from a retractor 28 and may be buckled at buckle 33. Thus, a traditional three-point belt system 20 has three points of contact, anchor 44, retractor 28 and buckle 33. FIG. 1 also shows a plus-two belt system 30 where the webbing 22 is anchored by anchor 37 at a first end and coiled on a retractor 36 at a second end.

Figure 2:
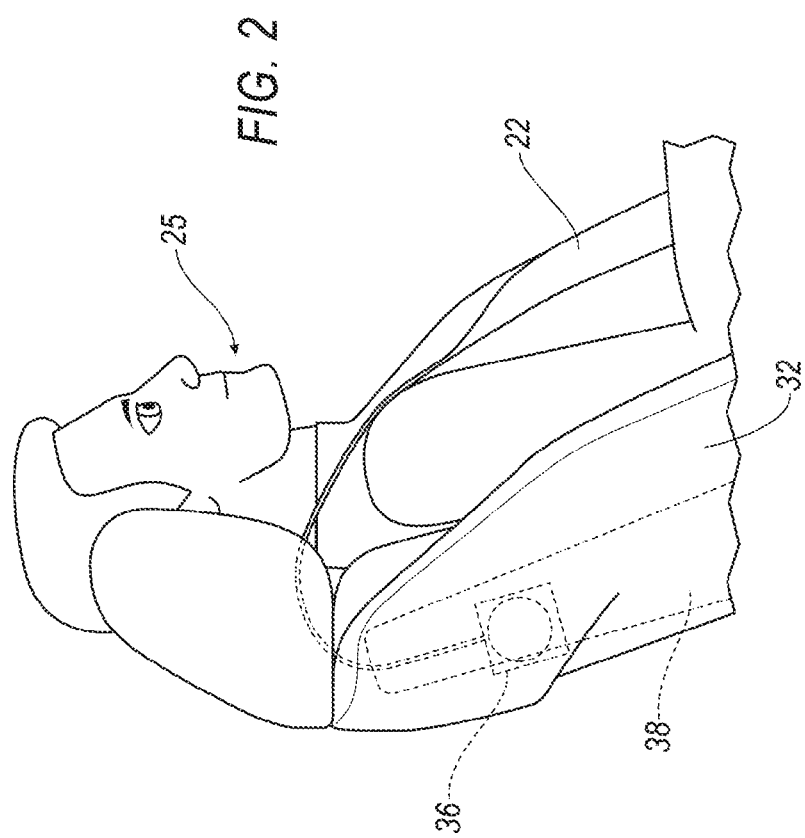
FIG. 2 is a side plan view of a plus-two belt system used by an occupant.
Figure 3:
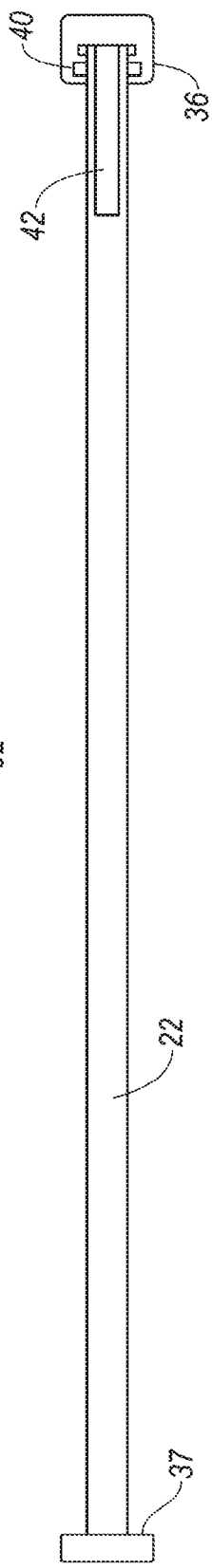
FIG. 3 is a schematic view of a plus-two belt system with a sensor.
Figure 4:
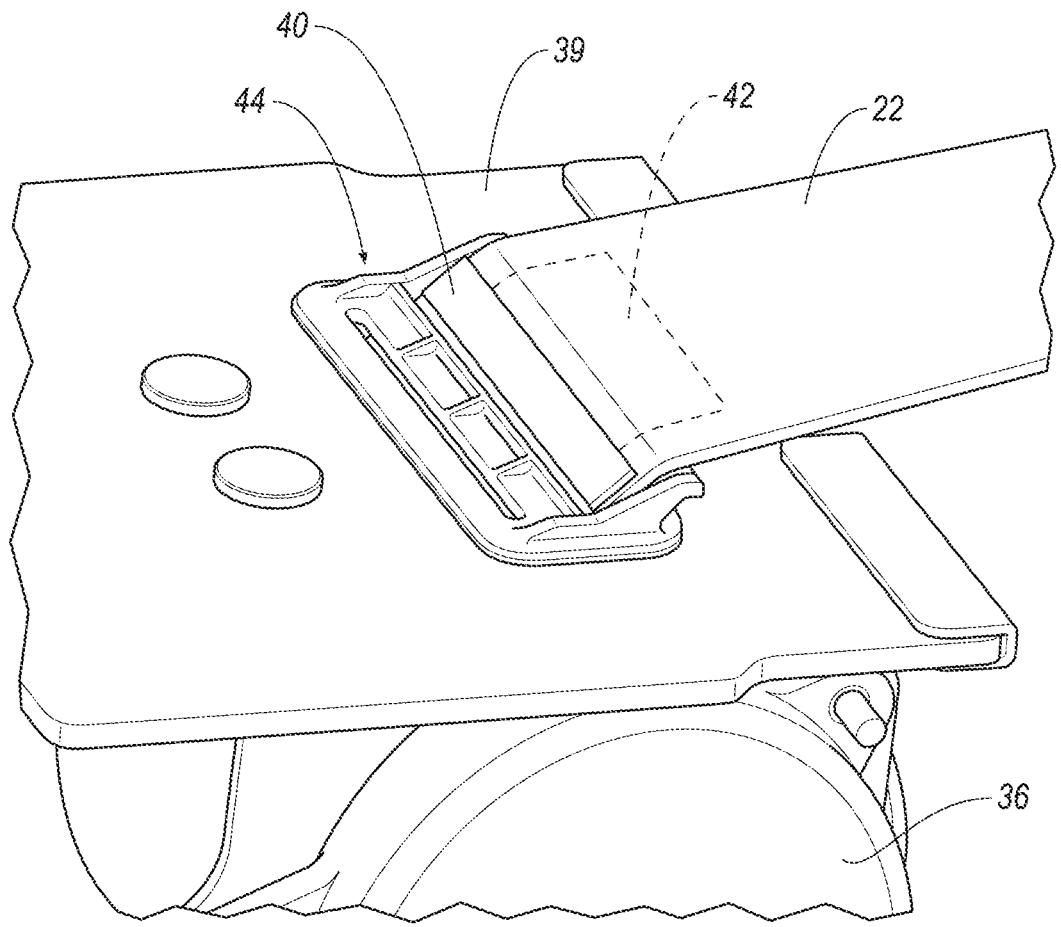
FIG. 4 is a perspective view of a plus-two belt system sensor and magnet.

FIG. 2 shows the plus-two belt system 30 being used by an occupant 25. As illustrated the webbing 22 of the plus-two belt system 30 is pulled over the shoulder of occupant 25. The webbing 22 is in a retracted position where the webbing 22 is coiled on a retractor 36 which, as shown, is located in the frame 38 of seat 32. FIG. 3 shows a schematic of the plus-two belt system 30 where a first end is captured by anchor 37 and the webbing 22 is coiled on the retractor 36 at its second end. The webbing 22 includes a flexible magnetic strip 42 positioned adjacent a sensor 40 when the plus-two belt is taut and not being used by a vehicle occupant. The magnetic strip 42 may be between 0.3 mm and 0.6 mm thick. As shown in FIG. 4 the magnetic strip 42 is sewn into the webbing 22. Flexible magnetic strip 42 may be a continuous metallic strip or may be a flexible magnetic webbing. Sensor 40 detects magnetic strip 42 when the plus-two belt 30 is not in use and is taut against seat 38. As noted above sensor 40 may be a Hall effect sensor.

FIG. 4 shows a close-up of webbing 22 passing through a seat support plate 39. The sensor 40 may be mounted on the seat support plate 39 adjacent a belt guide 44. The belt guide 44 provides a slot through which the webbing 22 passes and the webbing 22 is coiled on the retractor 36. When the plus-two belt system 30 is not in use the magnetic strip 42 is proximate or adjacent to the sensor 40 and detected by the sensor 40. When the plus-two belt system 30 is in use the magnetic strip 42 is no longer proximate sensor 40 because the webbing 22 has been uncoiled from the retractor 36.

Figure 5:
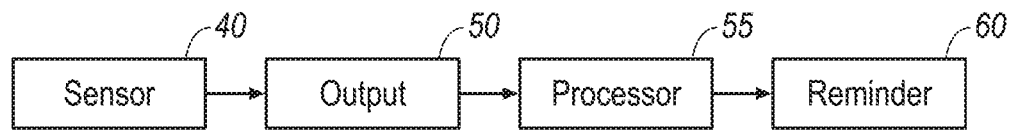
FIG. 5 is a schematic of a plus-two system with a sensor, output, processor and reminder.

FIG. 5 shows a processor system of the plus-two belt system 30. As shown the processor system includes a processor 55 which receives a signal from an output 50 of the sensor 40. The processor 55 may be embedded in a microcontroller. The microcontroller may include memory which may store instructions executable by the processor 55 and the processor 55 may read instructions from the memory and execute the instructions. Where the magnetic strip 42 is detected by sensor 40 the processor 55 can execute instructions to actuate an alarm or reminder which may be in the form of a reminder chime 60. The processor 55 may also execute instructions to actuate a chime where the three-point belt system is not buckled.

Figure 6:
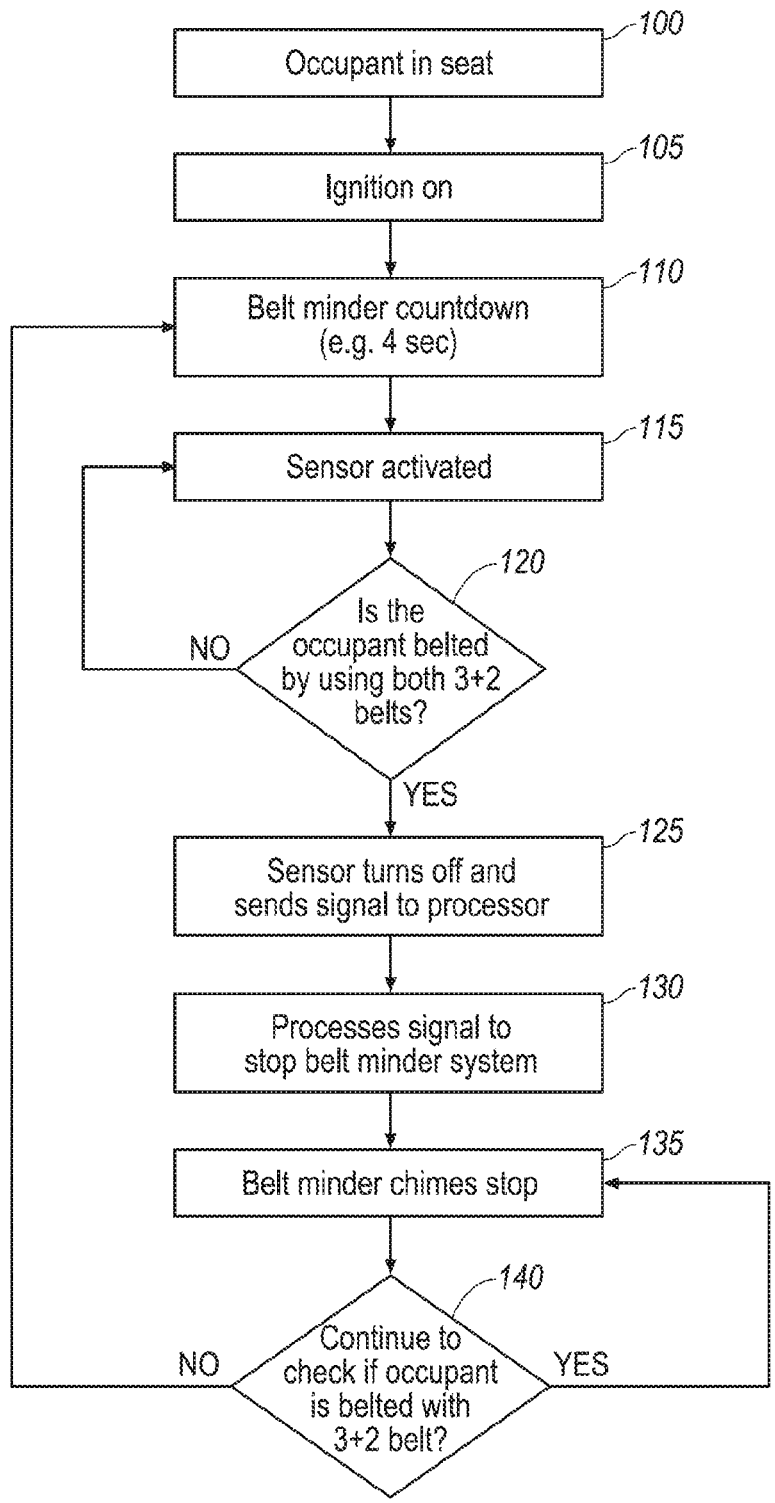
FIG. 6 is a flow diagram for a plus-two system.

FIG. 6 is a flow diagram that illustrates a belt reminder instruction set that may be executed by processor 55. At 100 the processor 55 recognizes that an occupant is in a vehicle seat. At 105 the processor 55 determines if the vehicle ignition is on. When an occupant is in a seat, and the vehicle ignition is on the processor 55 initiates a belt reminder countdown at block 110. The belt reminder countdown will actuate a chime where the belt systems, either the three-point belt or the plus-two belt is not engaged after a pre-set delay. The countdown or pre-set delay may be a matter of seconds, for example four to five seconds. For each seat where an occupant is sensed the processor 55 activates the sensor 40 at block 115. At block 120 the processor queries as to whether the occupant is using both the three-point belt system 20 and the plus-two belt system 30. In the example of the three-point system 20 the processor 55 will receive a signal indicating that the three-point belt is captured in the buckle 33. With respect to the plus-two belt system 30 the processor 55 will receive a signal from the output 50 indicating that the magnetic strip 42 is detected by sensor 40 where the plus-two belt system 30 is not in use. When the plus-two belt system 30 is in use the sensor 40 will not sense the magnetic strip 42. Where the sensor 40 does not detect the magnetic strip 42 the processor may turn off the sensor at block 125, turn off the belt reminder system at block 130 and to the extent that belt reminder chimes have started, turn off the belt reminder chimes at block 135.

At block 140 the processor 55 continues to monitor whether both the three-point belt system 20 and the plus-two belt system 30 are engaged. If they remain engaged the belt reminder remains in a mode where the belt reminder chimes are stopped as noted at block 135. Where the processor detects that either the three-point belt 20 or plus-two belt 30 is not engaged at block 140, the belt reminder countdown restarts at block 110. Thus, the processor periodically activates sensor 40 and initiates the belt reminder countdown at block 110 when the sensor 40 detects the magnetic strip 42.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a seat;
   a three-point seatbelt engageable with the seat;
   a two-point seatbelt including a retractor and a sensor each supported by the seat; and
   the two-point seatbelt including a webbing payable from the retractor and a magnetic strip embedded in the webbing and positioned within a readable vicinity of the sensor in a retracted position.

2. The system of claim 1, wherein the magnetic strip is outside the readable vicinit:
   of the sensor when the webbing is uncoiled from the retractor.

3. The system of claim 1, wherein the sensor is within the magnetic field of the magnetic strip when the webbing is in the retracted position.

4. The system of claim 3, wherein the sensor is spaced from the magnetic field of the magnetic strip when the webbing is uncoiled from the retractor.

5. The system of claim 1, further comprising a processor and memory storing instructions executable by the processor, the processor being programmed to set an alarm as a result of the magnetic strip being positioned within a readable vicinity of the sensor in the retracted position.

6. A system as in claim 1 wherein the sensor is a Hall effect sensor.

7. A system as in claim 6 wherein the retractor is in a seat back frame.

8. A system as in claim 7 wherein the magnetic strip is 0.3 to 0.6 mm thick.

9. A system as in claim 8 wherein the magnetic strip is a magnetic wire mesh.

10. A system as in claim 8 wherein the magnetic strip is sewn into the webbing.

11. A system as in claim 10 wherein the Hall effect sensor is mounted adjacent a guide.

12. A system as in claim 6 wherein the Hall effect sensor is mounted external to a seat back frame.

\* \* \* \* \*

UNITED STATES PATENT AND TRADEMARK OFFICE
CERTIFICATE OF CORRECTION

PATENT NO. : 10,384,639 B2
APPLICATION NO. : 15/274586
DATED : August 20, 2019
INVENTOR(S) : Robert William McCoy et al.

It is certified that error appears in the above-identified patent and that said Letters Patent is hereby corrected as shown below:

In the Claims

Column 4, in Line 48, Claim 2 replace "readable vicinit:" with -- readable vicinity --.

Signed and Sealed this
Tenth Day of December, 2019

Andrei Iancu
*Director of the United States Patent and Trademark Office*